Dec. 13, 1966  G. HERR  3,291,435
TWO PIECE VEHICLE REAR VIEW MIRROR
Filed Feb. 5, 1963  2 Sheets-Sheet 1

INVENTOR.
GERHARD HERR
BY
ATTORNEY.

Dec. 13, 1966  G. HERR  3,291,435

TWO PIECE VEHICLE REAR VIEW MIRROR

Filed Feb. 5, 1963  2 Sheets-Sheet 2

INVENTOR.
GERHARD HERR
BY Robert K. Youtie
ATTORNEY.

United States Patent Office 3,291,435
Patented Dec. 13, 1966

3,291,435
TWO PIECE VEHICLE REAR VIEW MIRROR
Gerhard Herr, Wuppertal-Vohwinkel, Germany, assignor to Gebr. Happich G.m.b.H., Wuppertal-Elberfeld, Germany, a company of Germany
Filed Feb. 5, 1963, Ser. No. 257,051
1 Claim. (Cl. 248—481)

The present invention relates to a driving mirror, particularly an internal driving mirror for automobiles, and has the primary object of obviating the danger to the driver and passengers of the automobile in case of an accident deriving from impact on the driving mirror.

The invention has the particular object of providing a driving mirror, wherein any hard, sharp corners are obviated, and any splinters of the mirror pane in case of breakage thereof are prevented from being contacted by the users of the automobile.

With these and other objects in view which will become apparent later from the following description and the accompanying drawings, I provide a driving mirror for automobiles comprising in combination: a mirror head consisting of resilient material and having a frame portion, an attachment arm connecting said driving mirror with the automobile, a ball-joint connecting said mirror head with said attachment arm, and a mirror pane having an edge inserted in said frame portion.

These and other features of my invention will be clearly understood from the following description of some embodiments thereof given by way of example with reference to the accompanying drawings, in which.

Figure 1:
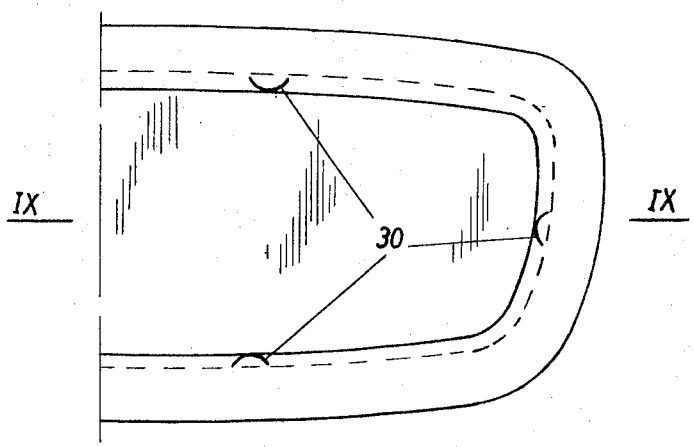
FIGURE 1 is a partial front elevational view showing a driving mirror constructed in accordance with the teachings of the present invention, only one half being shown as the mirror is conventional about its centerline.
Figure 2:
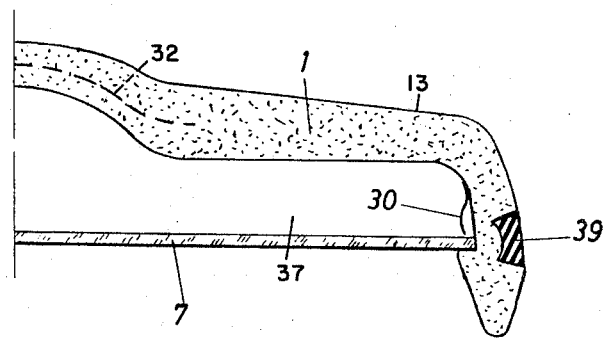
FIGURE 2 is a horizontal sectional view taken generally along the line IX—IX of FIGURE 1.
Figure 3:
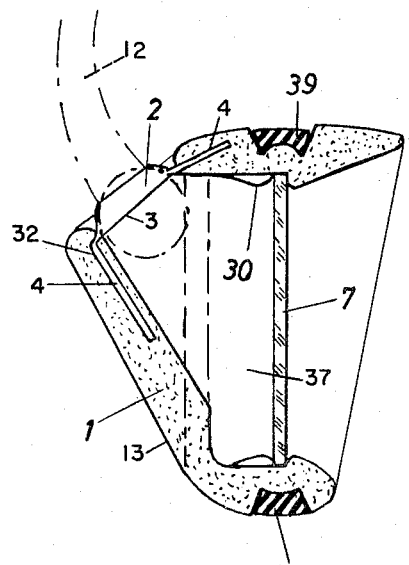
FIGURE 3 is an elevational sectional view of the mirror of FIGURES 1 and 2.
Figure 4:
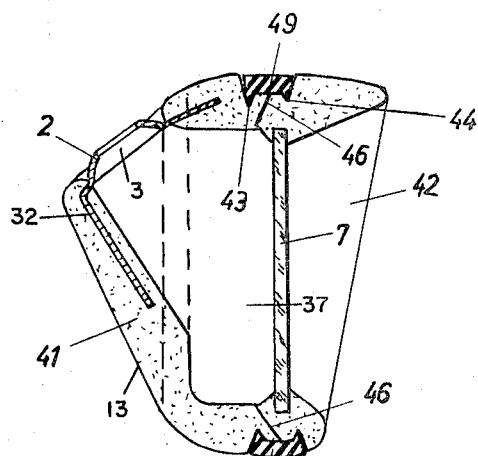
FIGURE 4 is an elevational sectional view similar to FIGURE 3 but showing a slightly modified embodiment.

Referring now to the drawings, and specifically to FIGURES 1–3 thereof, the mirror head 1 is of a hollow forwardly opening configuration and consists of a synthetic material namely preferably of yieldable synthetic foam material, wherein is embedded an insert 32 and a ball socket 2 having a part-spherical seat 3, said seat accommodating the leg of the mirror or holder arm 12 (FIG. 3). The carrier body consisting of synthetic foam material is enveloped by a non-porous outer skin 13 consisting of a soft synthetic sheet, namely at least on all those surfaces, which are visible after the finished mounting of the mirror. In the carrier body 1, a holder consisting preferably of sheet metal for the mirror head is embedded in the foam, which head is constructed as an insert 32. This clamping socket has arms 4 embedded in the foam extending toward opposite portions of the open head, and the part-spherical seat 3 forms one component of the ball-joint, which connects to the free end of the mirror arm in a universally rotatable manner, and thus establishes connection between the ball-joint and the mirror pane.

The mirror pane 7 is, as it were, "buttoned" into the carrier body consisting of synthetic foam material and covered by an outer skin, i.e. the mirror pane is pressed from the open side of the carrier body of synthetic foam material into the cavity open at one side of the carrier body of synthetic foam material, making use of the resilient yieldability of the surrounding margin, in such a manner that it snaps into the annular groove, which surrounds the edge the mirror pane from all sides. This "buttoning in" or snapping in of the mirror pane is carried out before a clamping strip 39 is inserted into an external groove of the carrier body of synthetic foam material along the whole perimeter thereof. This clamping strip 39 consists preferably of a solid strip of synthetic material, generally U-shaped in cross-section, the ends of which are connected with one another under preloading, for example by a clamp, by welding or cementing. The groove accommodating the clamping strip surrounds the carrier body of synthetic material like a ring on the outside at that zone which on the inside contains the groove for accommodating the edge of the mirror pane. After the mirror has snapped into the holder groove and after the clamping strip has been fitted, the mounting of the mirror in the carrier body of the mirror or the carrier body of foam material is secured in such a manner that the mirror pane can no longer be detached from its mounting by deformations of the margin of the carrier body of foam material surrounding the mirror pane.

As a material for the clamping strip preferably a metallised synthetic material is used, so that the clamping strip offers an aspect of metal lustre, and thus not only fulfils a technical function but serves also for adorning the interior of the vehicle.

Since the outer skin 13 of the mirror head consists of synthetic material, it can be matched in shape and colour with the interior fittings of the vehicle, and in particular may be provided with an imitation leather texture or fabric texture, the clamping strip not interfering therewith.

The cavities in the carrier body of foam material, in the case of an impact on the glass caused by an accident, allow the mirror pane to recede into the hollow carrier body without cracking, making use of the resiliency of the foam material. However, when the impact is so strong that the mirror pane breaks, the cavities form receptacles for the splinters, into which cavities no parts of the human bodies of persons hitting the mirror pane may enter, so that those parts of the human body of the person in danger do not come into contact with the splinters. Alternatively, a splinter-proof mirror of silicate glass with a synthetic layer covering its rear surface may be used.

In order to enlarge the receptacle space for the splinters, the inner cavity in the mirror head may be constructed without supporting ribs in the cavity 37. This cavity 37 has a considerable depth in the direction of impact, and since the mirror pane 7 is held at its margin only by holder arms 30, the receding of the mirror pane into the cavity in case of an impact caused by an accident is facilitated, since the mirror pane, without breaking, has only to push the arms 30 back, making use of the resiliency of the carrier body of foam material, in order to overcome the resistance of the narrowest passage towards the cavity.

The deep cavity, which extends substantially over the entire area of the mirror has moreover the advantage, that at will either, as illustrated in the drawing, a simple mirror pane may be inserted, or a casing with a conventional mirror tipping device, which when operated by tipping the mirror prevents any dazzling of the driver in darkness by the glare of headlamps of vehicles behind the driver's own vehicle. These mirror tipping devices require a certain structural depth so as not to impair the range of movements of the tipping movements within the mirror casing.

The sheet metal insert 32 for the attachment of the mirror arm is embedded in the body of foam material but does not in this case establish a connection between the ball-joint and the edge of the mirror pane, so that the yieldability of the mirror head 1 is increased. The clamping strip 39 is constructed in this embodiment as a solid section with inner longitudinal edges and a concave inner surface.

According to a further embodiment, the carrier body of foam material may be constructed in two portions. A rear hollow forwardly facing portion 41, contains the clamping socket 37 embedded in foam, while the other front frame portion, 42, embraces the mirror pane 7 with a snap action. Both portions of the carrier body of foam material contact one another on a chamfered annular face 46, so that they are mutually centering, i.e. are maintained in their complementary position. Any sliding off relative to one another say in the direction of the surface of the mirror pane, is prevented by this conical construction of the separating gaps 46. Both portions are held together by a clamping strip 49 which has a U-profile and is closed in itself as a ring, one leg, 43, of the U-profile engaging in the portion 41, and the other leg, 44 into the portion 42 of the body of foam material.

This embodiment results in a facilitated manner of mounting and of production. The front portion 42 is softer and more yieldable than the rear portion 41, so that the mirror pane 7 may be inserted more readily. Moreover, this embodiment facilitates the insertion of a conventional mirror tipping device into the cavity of the carrier body of synthetic material. Moreover, the tools or the moulds for the foam for the production of the two portions of the carrier body of foam material may be produced more readily and inexpensively than for the production of a carrier body consisting in a single piece. All these features are important for the invention.

While I have described herein and illustrated in the accompanying drawings what may be considered typical and particularly useful embodiments of any said invention, I wish it to be understood that I do not limit myself to the particular details and dimensions described and illustrated; for obvious modifications will occur to a person skilled in the art.

What I claim as my invention and desire to secure by Letters Patent, is:

A rear-view automobile mirror for mounting on a ball, comprising a mirror pane; a sectional carrier of resiliently yieldable foam material including a front frame part extending circumferentially about the peripheral edge of said pane and having an internal groove receiving said pane, and a hollow forwardly facing rear body part having its front edge conformably engaging the rear side of said frame part; a sheet-metal insert embedded in the material of said body part rearwardly of said pane and formed with a central socket portion for receiving a mounting ball and arms extending toward opposite portions of said frame; and a clamping strap of generally U-shaped cross-sectional configuration extending about and clamping together said body and frame parts and exerting through said frame part a holding force on said pane.

References Cited by the Examiner

UNITED STATES PATENTS

| | | | |
|---|---|---|---|
| 1,177,367 | 3/1916 | Stevens | 351—102 |
| 1,327,865 | 1/1920 | Flaxbaum | 88—96 |
| 2,346,495 | 4/1944 | Lingel | 189—64 |
| 2,498,065 | 2/1950 | Budreck | 88—98 |
| 2,575,854 | 11/1951 | Verhagen | 189—64 |
| 2,910,915 | 11/1959 | Harris | 88—96 |
| 3,001,748 | 9/1961 | Austin. | |

FOREIGN PATENTS

| | | |
|---|---|---|
| 1,243,950 | 9/1960 | France. |
| 525,988 | 9/1940 | Great Britain. |
| 742,838 | 1/1956 | Great Britain. |
| 560,262 | 4/1957 | Italy. |

JEWELL H. PEDERSEN, *Primary Examiner.*

O. B. CHEW, *Assistant Examiner.*